(12) United States Patent
Tiberghien et al.

(10) Patent No.: US 8,123,258 B2
(45) Date of Patent: Feb. 28, 2012

(54) FEMALE ELEMENT OF A QUICK CONNECT PIPE COUPLING

(75) Inventors: Alain-Christophe Tiberghien, Sevier (FR); Antoine Chambaud, Giez (FR)

(73) Assignee: Staubli Faverges, Faverges (FR)

( * ) Notice: Subject to any disclaimer, the term of this patent is extended or adjusted under 35 U.S.C. 154(b) by 773 days.

(21) Appl. No.: 11/806,009

(22) Filed: May 29, 2007

(65) Prior Publication Data
US 2007/0278791 A1    Dec. 6, 2007

(30) Foreign Application Priority Data
May 30, 2006  (FR) ...................................... 06 04801

(51) Int. Cl.
*F16L 37/18*  (2006.01)
(52) U.S. Cl. ........... 285/316; 285/34; 285/307; 285/322
(58) Field of Classification Search .................... 285/33, 285/34, 35, 277, 305, 307, 308, 316, 317, 285/322, 332; 137/614.03, 614.04, 614.05; 403/166, 304, DIG. 3, DIG. 4
See application file for complete search history.

(56) References Cited

U.S. PATENT DOCUMENTS

| | | | | |
|---|---|---|---|---|
| 2,344,740 A | * | 3/1944 | Shaff | 285/277 |
| 2,468,562 A | * | 4/1949 | Lank | 144/219 |
| 2,631,872 A | * | 3/1953 | Wurmser | 285/277 |
| 3,133,755 A | * | 5/1964 | Sciuto, Jr. | 285/277 |
| 3,188,123 A | * | 6/1965 | Hansen | 285/277 |
| 3,191,972 A | * | 6/1965 | Collar | 285/93 |
| 3,228,715 A | * | 1/1966 | Neilon et al. | 285/313 |
| 3,666,300 A | * | 5/1972 | Russell | 285/316 |
| 3,960,428 A | * | 6/1976 | Naus et al. | 439/315 |
| 4,392,759 A | * | 7/1983 | Cook | 403/11 |
| 4,951,977 A | | 8/1990 | Shutt | |
| 2005/0121906 A1 | * | 6/2005 | Tiberghien et al. | 285/316 |
| 2007/0114794 A1 | * | 5/2007 | Frost et al. | 285/317 |

FOREIGN PATENT DOCUMENTS

| | | |
|---|---|---|
| EP | 1531297 | 5/2005 |
| FR | 2438226 | 4/1980 |
| GB | 2036906 A | 7/1980 |

* cited by examiner

*Primary Examiner* — James Hewitt
*Assistant Examiner* — Jay R Ripley
(74) *Attorney, Agent, or Firm* — Dowell & Dowell, PC

(57) ABSTRACT

A female rapid coupling element is adapted to receive a male element by insertion along a longitudinal axis (X-X') and includes at least one locking member which is movable along an oblique axis and has an end engageable in a groove of a male element. A head of the locking member is provided with at least one lug defining a first surface oriented towards the end and adapted to receive in sliding contact a corresponding surface of a first component. A sliding plane ($P_1$) between these surfaces is inclined at an angle of between approximately 75° and 105° with respect to the oblique axis of translation of the member. The head has two lugs arranged on either side of a rod or stem that extends between the end and the head.

12 Claims, 8 Drawing Sheets

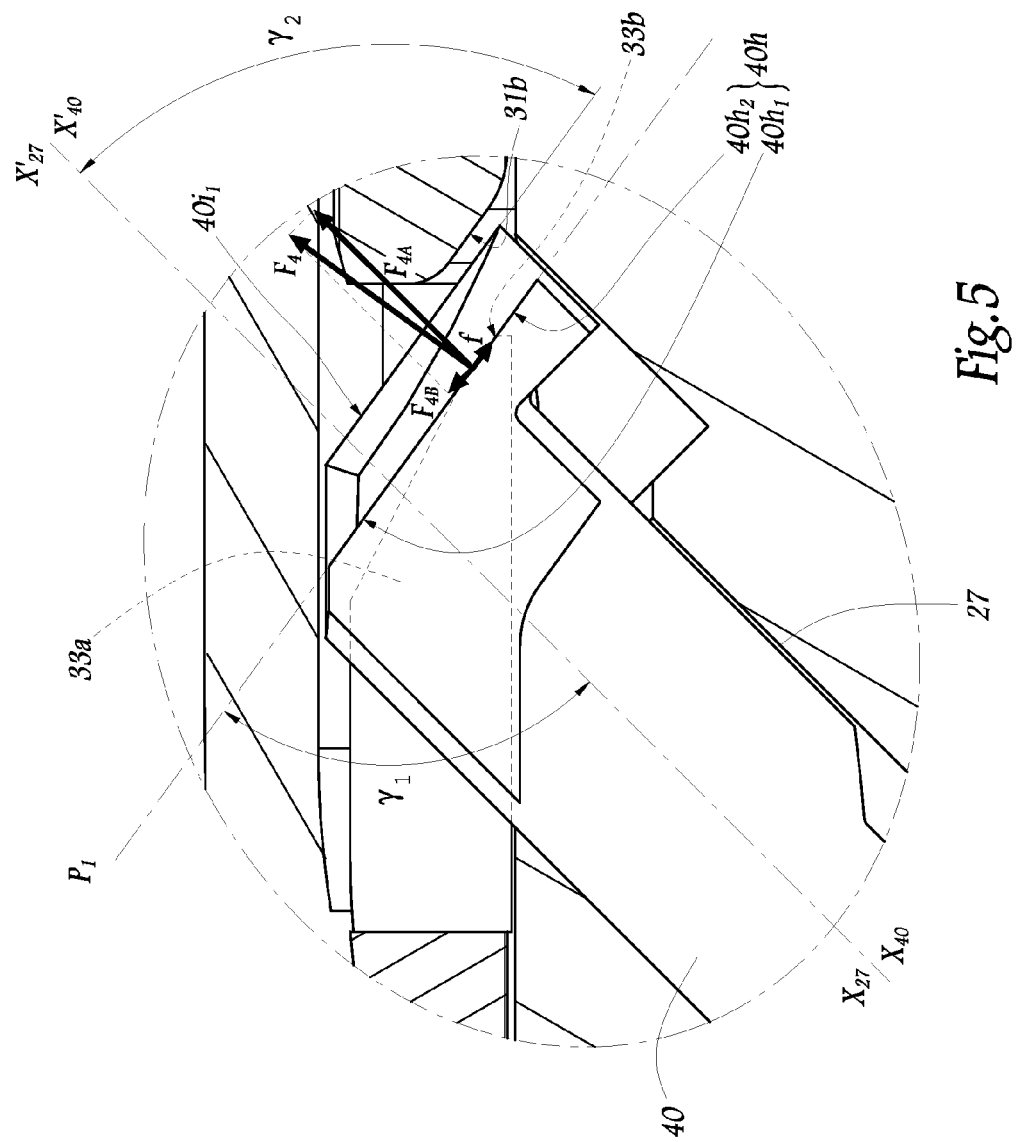

FEMALE ELEMENT OF A QUICK CONNECT PIPE COUPLING

BACKGROUND OF THE INVENTION

1 Field of the Invention

The invention relates to a female element of a rapid coupling as well as to a rapid coupling for an installation for handling fluid under pressure which comprises, among other things, such a female element.

2 Description of the Related Art

In the field of removable joining of pipelines traversed by a fluid under pressure, it is known to use a female coupling element which comprises controlled means for locking a male element in the inserted configuration in the female element, that is to say, in the coupled configuration of the pipelines.

It is known from EP-A-1 531 297 to use locking fingers movable in translation in housings inclined with respect to the axis of insertion of the male and female elements one into the other. Each locking finger is equipped with a tab, protruding radially with respect to the body of the female element and intended to interact with a control ring for controlling the position of the locking finger. The control ring exerts on the tab of each locking finger efforts directed parallel to the insertion axis. In the known device, the displacement of the locking fingers in their housing presents difficulties. Indeed, since the efforts exerted by the control ring are directed parallel to the insertion axis, the locking fingers have a tendency to tilt in their housings. This tilting opposes the action of the control ring for engaging the locking fingers in the peripheral groove of the male element or for extracting them therefrom.

Moreover, FR-A-2 438 226 describes a female coupling element comprising locking fingers movable in inclined housings of a body of the female element. Each locking finger has a notch which defines a nose protruding radially with respect to the body of the female element, the nose being intended to co-operate with a control ring for controlling the displacement of the finger. However, in this device, the efforts exerted by the control ring on each finger are applied at the notch of the finger and tend to make the fingers more fragile during unlocking. U.S. Pat. No. 4,951,977 also describes a female coupling element in which a control ring for controlling the displacement of locking fingers acts at a notch of each finger. The result thereof is limited mechanical resistance of the locking fingers, as in the device described in FR-A-2 438 226.

BRIEF SUMMARY OF THE INVENTION

It is these drawbacks which the invention is intended more particularly to remedy by proposing a female rapid coupling element capable of co-operating with a male element and provided with a locking system which is easy to use and which exhibits a good mechanical resistance.

To this end, the subject of the invention is a female element of a rapid coupling intended for removable joining of pipelines for fluid under pressure, the element being adapted to receive a male element inserted therein along a longitudinal axis and being equipped with at least one elongate locking member, movable in translation parallel to an axis which is oblique with respect to the axis of insertion of the elements, the member being provided with a first end, intended to be engaged in a peripheral groove of a male element inserted in the female element, and with a head protruding radially with respect to an outer radial surface of the body of the female element and engaged between a first and a second component which are controlled by a main ring mounted around the body of the female element with the possibility of translation parallel to the axis of insertion, the head of the locking member being provided with at least one lug defining a first surface, oriented towards the first end and adapted to receive in sliding contact a corresponding surface of the first component, the sliding plane between the first surface and the corresponding surface of the first component being inclined at an angle of between around 75° and 105° with respect to the axis of translation of the locking member, wherein the head has two lugs arranged on either side of a rod for connection between the first end and the head.

By means of the invention, the locking system comprising at least one locking member or finger and the main ring controlling the first and second components effectively fulfils its function of locking a male element in the inserted configuration, while ensuring an easy passage between the locked and unlocked positions of the locking finger. In fact, owing to the inclination of the sliding plane with respect to the axis of translation of the locking member, the effort exerted by the first component on the locking finger is substantially parallel to the axis of displacement in translation of the finger. This effort is therefore transmitted effectively to the finger to displace it in translation in its housing between the locked and unlocked positions, while minimising its tilting. In addition, the rod of the locking finger makes it possible to reinforce the mechanical resistance of the finger subjected to the action of the first component, while the two lugs, arranged on either side of the rod, contribute to balancing the effort exerted by the first component on the locking finger and facilitate the displacement in translation of this latter without lateral tilting. The arrangement of the two lugs on either side of the rod also makes it possible to limit the overall dimensions of the locking finger compared with a locking finger of the prior art having a nose.

According to other advantageous characteristics of the invention:

- the first surface is inclined at an angle of between around 75° and 105° with respect to the axis of translation of the member;
- the corresponding surface of the first component is inclined at an angle of between around 75° and 105° with respect to the axis of translation of the member;
- the head forms at least a second surface, oriented opposite from the first end and adapted to receive in sliding contact a corresponding surface of the second component, the sliding plane between the second surface and the corresponding surface of the second component being inclined at an angle of between around 75° and 105° with respect to the axis of translation of the member;
- the sliding plane between the first surface and the corresponding surface of the first component is inclined with respect to the axis of translation of the member at an angle of between around 75° and 90°;
- the sliding plane between the second surface and the corresponding surface of the second component is inclined with respect to the axis of translation of the member at an angle of between around 75° and 90°;
- the rod of the member is intended to be received in a slot of the first component, the first surface defined by each lug being adapted to receive in sliding contact a corresponding surface of a lateral portion of the slot;
- the first component is formed by a slotted ring separate from the main ring and adapted to be displaced in translation, parallel to the insertion axis and in the direction of the member, under the action of the main ring;

the second component is a secondary ring separate from the main ring and adapted to slide with respect to the main ring, parallel to the insertion axis, under the action of the member and of resilient means;

a single ring, separate from the main ring, constitutes the first and second components and is adapted to be displaced in translation parallel to the insertion axis, under the action of the main ring and of resilient means;

each lug of the locking member is adapted to be received in a recess of the ring constituting the first and second components, the first surface defined by the lug being adapted to receive in sliding contact a corresponding surface of an edge of the recess, which edge belongs to the first component.

The invention also concerns a rapid coupling for an installation for handling fluid under pressure which comprises a male element and a female element, and the female element of which is such as described above.

Such a coupling is easier to manipulate and more reliable than those of the prior art. It may be applied in the field of filling of automotive vehicle tanks, in which case the male element is connected to a pipeline for feeding a vehicle fuel tank.

BRIEF DESCRIPTION OF THE DRAWINGS

The characteristics and advantages of the invention will become clear from the following description of two embodiments of a female element and of a rapid coupling according to the invention, provided solely by way of example and with reference to the appended drawings, in which:

FIG. 5 is a view on an enlarged scale of the detail V of FIG. 4, the dimensions of the efforts having been increased for improved display;

DESCRIPTION OF THE PREFERRED EMBODIMENTS

Figure 2:
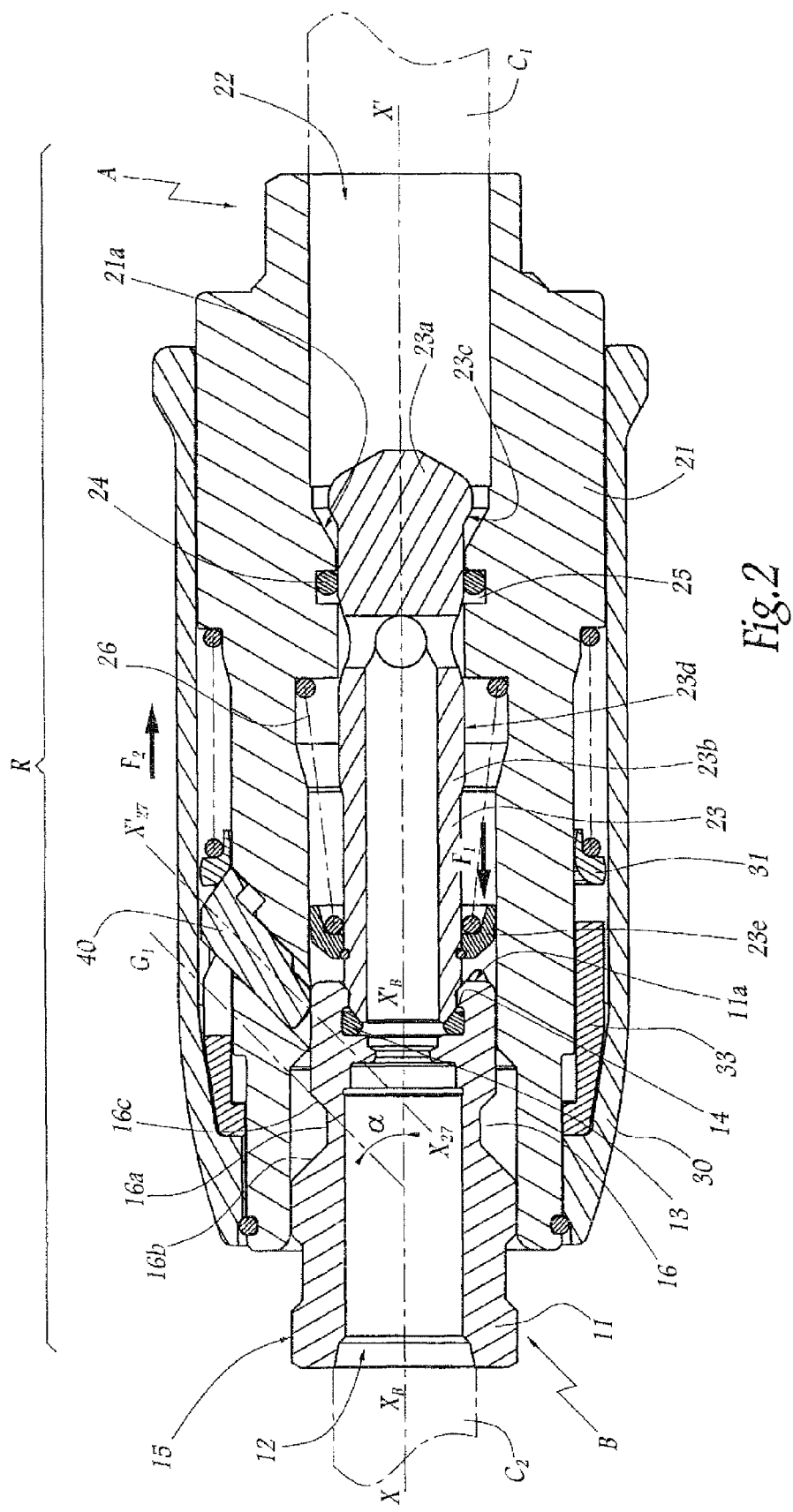
FIG. 2 is a longitudinal section of a coupling according to the invention incorporating the female element of FIG. 1, during the insertion of its male and female elements into each other.
Figure 3:
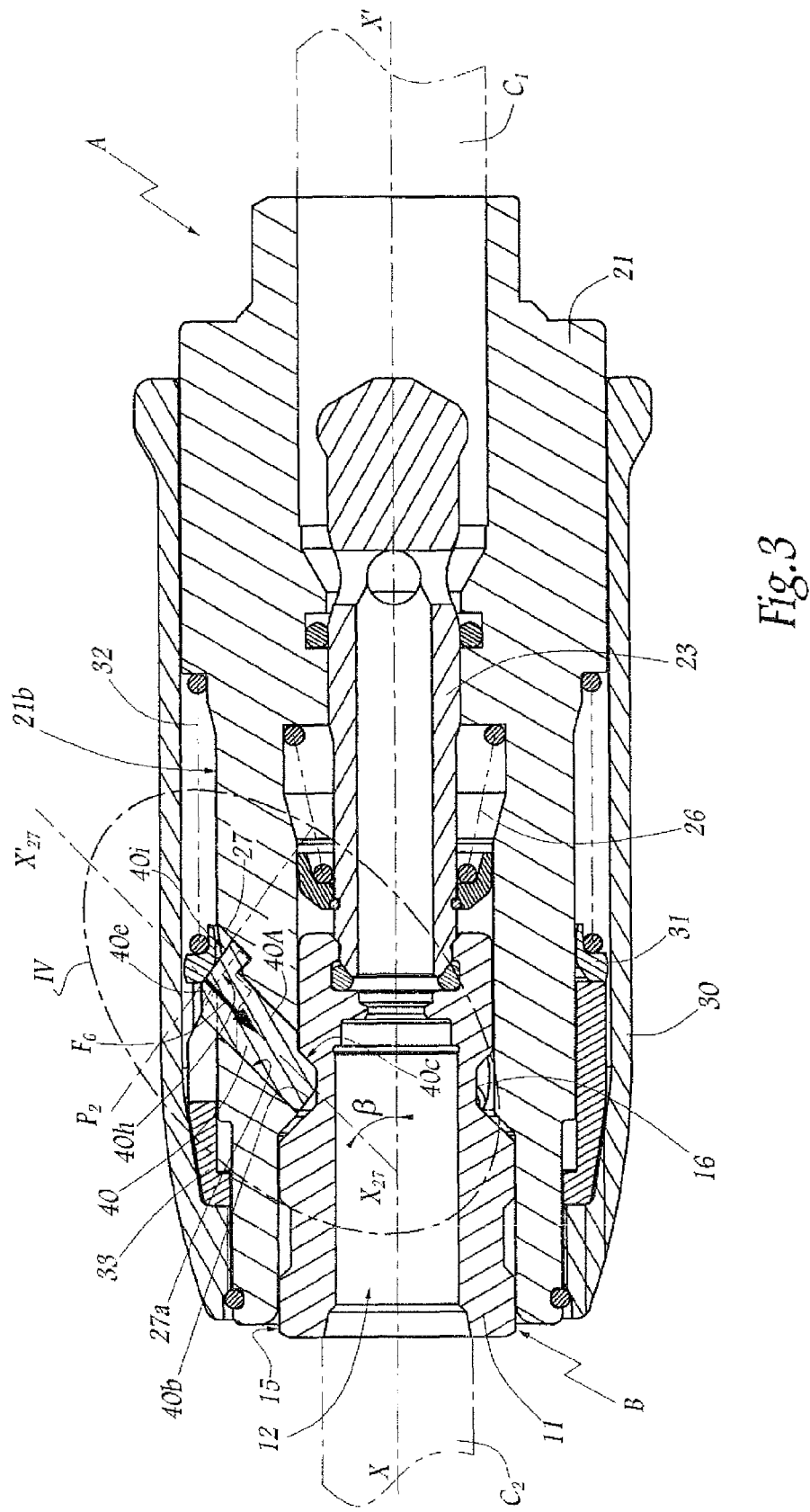
FIG. 3 is a view analogous to FIG. 2 when the male and female elements are in the inserted position.

The rapid coupling R shown in FIGS. 2 and 3 comprises a female element A and a male element B which are arranged to be inserted one into the other in the direction of an axis X-X', which is a longitudinal axis common to the elements A and B.

The rear part of the female element A is fluidically connected to a first pipeline $C_1$, while the rear part of the male element B is connected to a second pipeline $C_2$. By way of example, the male element B is mounted on an automotive vehicle and the pipeline $C_2$ serves to feed the fuel tank (not shown) of the vehicle with gas, under a pressure of the order of 250 bars, while the female element A is connected by the pipeline $C_1$ to a source (not shown) of fuel under pressure. In this case, the female element A may equip a service station and be intended to co-operate in succession with the male elements B mounted on different automotive vehicles.

The male element B comprises a tubular body 11 onto which is connected the pipeline $C_2$ and which defines an internal fluid circulation channel 12. The channel may constitute a housing for a non-return valve (not shown). An O-ring 13 is mounted in an inner peripheral groove 14 of the body 11, so as to ensure tight sealing of the connection of the pipelines $C_1$ and $C_2$ in the inserted position of the elements A and B.

On its outer radial surface 15, the body 11 is provided with a peripheral groove 16 the profile of which is defined by a flat bottom 16a and sides 16b and 16c that diverge away from the bottom 16a. Thus, the bottom 16a is cylindrical, while the sides 16b and 16c are frustoconical.

The male element B is symmetrical in revolution about an axis $X_B$-$X'_B$ which coincides with the axis X-X' on insertion of the male element into the female element A.

The reference $G_1$ is given to the generatrix line of the surface of the side 16c of the groove 16 which is nearest to the end 11a of the body 11 intended to be introduced into the element A. This generatrix line is rectilinear and oblique with respect to the axis $X_B$-$X'_B$, with an angle of obliquity α of around 45°. The surface generated by the generatrix line $G_1$ is therefore a frustoconical surface with half angle at the vertex α.

The female element A comprises a body 21, also tubular, onto which the pipeline $C_1$ is connected. The body defines a central channel 22 in which is arranged a valve 23 movable parallel to an axis $X_A$-$X'_A$ which is a central axis of the element A, coinciding with the axis X-X' on insertion of the elements A and B one into the other.

The valve 23 comprises a solid part 23a and a hollow part 23b, the solid part 23a having a cylinder-conical outer surface 23c intended to bear against a seat 21a formed by the body 21. An O-ring 24 is installed in an inner groove 25 of the body 21 and is intended to provide a tight seal with the surface 23c or with the outer radial surface 23d of the part 23b.

A spring 26 exerts on a collar 23e of the valve 23 an elastic effort $F_1$ tending to press the part 23a against the seat 21a, that is to say, to close the female element A.

Figure 1:
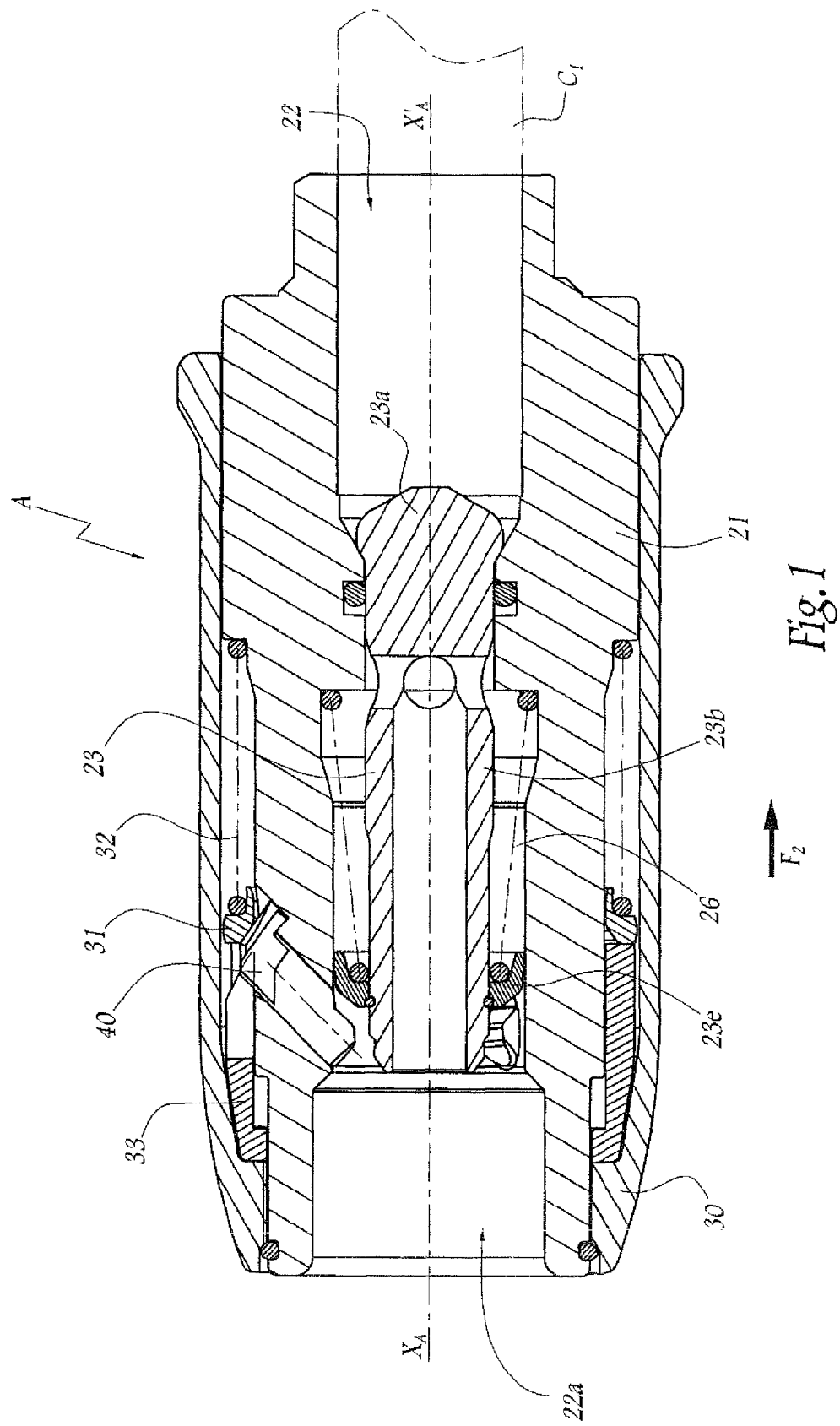
FIG. 1 is a longitudinal section of a female coupling element according to a first embodiment of the invention.

A main ring 30 is mounted around the body 21 and is movable in translation with respect to this latter and parallel to the axis $X_A$-$X'_A$, as indicated by the arrow $F_2$ in FIG. 1.

Five locking fingers 40 are arranged to be partially engaged in the groove 16 of the element B in the inserted configuration shown in FIG. 3.

Each finger 40 is arranged in a housing 27 provided in the body 21, the dimensions of the housing 27 being such that the surface 27a defining the housing can co-operate with the outer surface 40a of a cylindrical part 40A of the finger 40, with straight generatrix line and circular base, to guide the finger 40 in translation.

The surface 27a forms an abutment 27c on which bears a heel 40f of the finger 40, thereby limiting the movement of the finger towards the channel 22.

The housing 27 opens out both at the channel 22 and at a volume V defined between the outer radial surface 21b of the body 21 and the inner radial surface 30b of the main ring 30.

Figure 4:
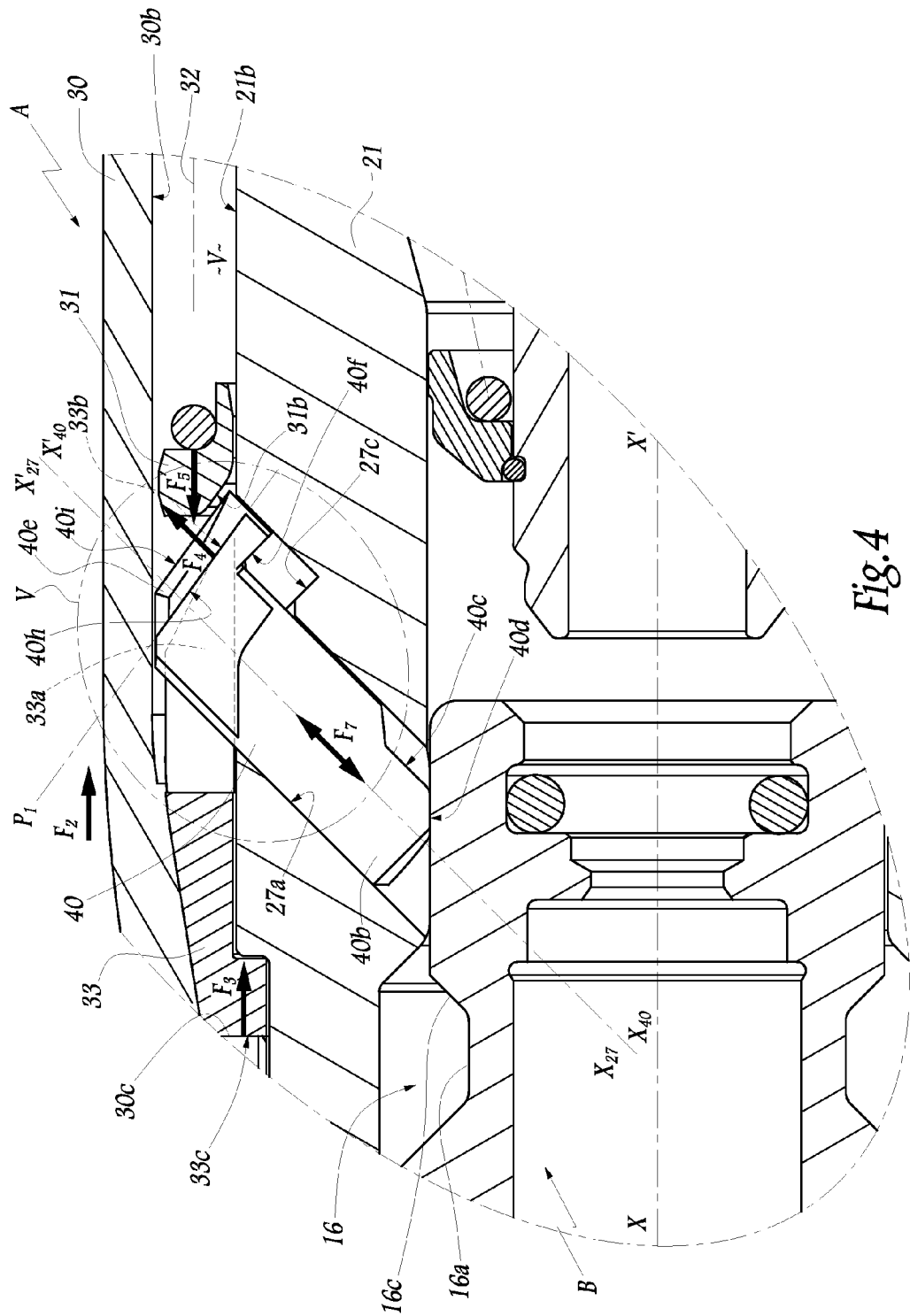
FIG. 4 is a view on an enlarged scale of the detail IV of FIG. 3 during the uncoupling of the male and female elements.

The housing 27, shown on an enlarged scale in FIG. 4, extends in the direction of an axis $X_{27}$-$X'_{27}$ which is oblique with respect to the axis $X_A$-$X'_A$, that is to say, to the axis X-X' when the male and female elements are in the inserted configuration. The reference β is given to the angle of obliquity between the axes $X_{27}$-$X'_{27}$ and $X_A$-$X'_A$. This angle β is selected to be equal to the angle α.

In practice, the angles α and β may have values of between 15 and 65°, preferably between 30 and 55°. The axes $X_{27}$-$X'_{27}$ and $X_A$-$X'_A$ are convergent in the direction of the mouth 22a of the channel 22 through which the male element B is introduced.

Each finger 40 is provided with an end 40b which is intended to protrude into the channel 22 from the housing 27 in order to be engaged in the groove 16. The end 40b is defined by a frustoconical and concave surface 40c, having a half angle at the vertex, with respect to the longitudinal axis $X_{40}$-$X'_{40}$ of the part 40A, of equal value to that of α and having a radius of curvature similar to that of the surface forming the side 16c, such that the end 40b and the side 16c are complementary at the surface 40c, thereby guaranteeing a surface bearing between the finger 40 and the body 11.

The end 40b is also defined by a surface 40d in the shape of a portion of a cylinder, of circular cross-section with a geometry complementary to that of the bottom 16a of the groove 16.

It is thus possible to obtain the bearing of the finger 40 in the groove 16 both on its bottom 16a and on its side 16c. As a variant, the end 40b may bear on the edge 16c without contact between the surface 40d and the bottom 16a, since the co-operation of the surface 27c and of the heel 40f limits the centripetal displacement of the finger 40. Inasmuch as it does not come to bear against the bottom 16a, the surface 40d may have a geometry other than that mentioned above. It may be flattened, provided that it does not interfere with the surface bearing between the surface 40c and the edge 16c.

When it is in place in the housing 27, the finger 40 has its axis $X_{40}$-$X'_{40}$ coinciding with the axis $X_{27}$-$X'_{27}$.

The finger 40 is also provided with a head 40e protruding radially with respect to the surface 21b outside the housing 27. The head 40e has two lateral lugs 40g, arranged on either side of a rod or stem 40j for connection between the end 40b and the head 40e, and in particular, in this embodiment, between the cylindrical part 40A and the head 40e. The rod or stem 40j has a transverse dimension, taken transversely with respect to the lugs 40g and to a longitudinal axis of the finger, at least equal to the diameter of the cylindrical part 40A. The lugs 40g each define a first surface 40h of the head 40e, oriented towards the end 40b, substantially perpendicularly to the longitudinal axis $X_{40}$-$X'_{40}$ of the finger 40 which coincides with the axis $X_{27}$-$X'_{27}$ in the assembled configuration of the element A. In addition, the head 40e forms a second surface 40i which is oriented in the opposite direction from the end 40b, substantially perpendicularly to the axis $X_{40}$-$X'_{40}$.

More specifically, the surfaces 40h and 40i may be acceptably inclined with respect to the longitudinal axis $X_{40}$-$X'_{40}$ of the finger 40, at a respective angle $\gamma_1$ or $\gamma_2$ of between around 75° and 105°.

The head 40e is engaged between a secondary ring 31 and a slotted ring 33. The slotted ring 33 is controlled by the main ring 30. The secondary ring 31 is loaded by a spring 32 and is movable parallel to the axis $X_A$-$X'_A$ in the volume V defined between the outer radial surface 21b of the body 21 and the inner radial surface 30b of the main ring 30. Thus, the ring 31 is controlled by the main ring 30 and by the spring 32.

The front face 33c of the slotted ring 33, oriented towards the mouth 22a of the female element A, bears against a shoulder 30c provided on the inner surface 30b of the main ring 30. The rod 40j of each finger 40 is engaged in a slot 33a of the ring 33. The surfaces 33b of lateral portions 33d of each slot 33a are adapted to co-operate by sliding contact with the first surfaces 40h defined by the lugs 40g of each finger 40. Each surface 40h comprises a first portion $40h_1$, located on the same side as the ring 33 and the shoulder 30c with respect to the axis $X_{40}$-$X'_{40}$, and a second portion $40h_2$, located opposite to the ring 33 on the same side as the ring 31 with respect to the axis $X_{40}$-$X'_{40}$. Thus, the portions $40h_1$ and $40h_2$ extend on either side of the axis $X_4O$-$X'_{40}$. Each surface 33b is inclined with respect to a radial direction of the ring 33, so as to come effectively into sliding contact against the consecutive portions $40h_1$ and $40h_2$ of each surface 40h. In particular, the surface 33b is substantially parallel to the surface 40h, thereby allowing the surface bearing of the surface 33b on the corresponding surface 40h.

Starting from the inserted position of the elements A and B, when the main ring 30 of the element A is displaced manually by an operator in the direction of the rear of the body 21, that is to say, in the direction of the pipeline C1, by an effort in the direction of the arrow $F_2$ of FIG. 4, the shoulder 30c exerts on the face 33c of the ring 33 an effort $F_3$ which has the effect of displacing each slot 33a with respect to the rod 40j, entraining the surfaces 33b of the lateral portions 33d of each slot 33a in the direction of the surfaces 40h. When these surfaces 33b come into contact with the portions $40h_1$ of the surfaces 40h, they exert on these surfaces an effort $F_4$ which has the effect of displacing each finger 40 in the corresponding housing 27 in the direction of the volume V, in opposition to the effort exerted by the spring 32. Owing to the inclination of the surfaces 40h and 33b of the value selected for the angle $Y_1$, the sliding plane $P_1$ between each surface 40h and the corresponding surface 33b, which corresponds to the plane of the surfaces 40h and 33b in sliding contact one against the other, is inclined by the angle $\gamma_1$ and the effort $F_4$ is substantially parallel to the coinciding axes $X_{40}$-$X'_{40}$ and $X_{27}$-$X'_{27}$.

The displacement of the finger 40 in the housing 27 under the action of the ring 33 allows the extraction of its end 40b from the groove 16 and from the channel 22. The finger 40 does not then oppose withdrawal of the male element B from the channel 22.

The spring 32 installed in the volume V exerts on the secondary ring 31 a resilient return effort $F_5$, directed towards the slotted ring 33 and the finger 40. When the effort exerted on the main ring 30 is released, the effort $F_5$ is transmitted to each finger 40 in the form of an effort $F_6$, which can be seen in FIG. 3, exerted by a surface 31b of the secondary ring 31 on the second surface 40i of the head 40e. The surface 31b is substantially parallel to the surface 40i. Owing to the inclination of the surface 40i of the value selected for the angle $\gamma_2$, the sliding plane $P_2$ between the surface 40i and the corresponding surface 31b, which corresponds to the plane of the surfaces 40i and 31b in sliding contact one against the other, is inclined by the angle $\gamma_2$ and the effort $F_6$ is substantially axial and parallel to the coinciding axes $X_{40}$-$X'_{40}$ and $X_{27}$-$X'_{27}$. Each finger 40 is then displaced in the opposite direction to the movement mentioned previously, in order to reach the position shown in FIGS. 1 and 3 where it protrudes into the channel 22.

Advantageously, and as in the embodiment described, the surface 40h is "flowing", that is to say, the angle $\gamma_1$ of inclination of the surface 40h with respect to the longitudinal axis $X_{40}$-$X'_{40}$ of the finger 40 is strictly less than 90°, when taken between the portion $40h_1$ of the surface 40h and the portion of the axis $X_{40}$-$X'_{40}$ defined between the end 40b of the finger 40 and the surface 40h. In this way, it is possible to eliminate any residual risk of tilting of the finger 40 in its housing 27, as illustrated by the effort diagram in FIG. 5. FIG. 5 represents the interaction between a surface 33b and a surface 40h, it being understood that a similar analysis may be made for the interaction between a surface 31b and a "flowing" surface 40i, that is to say, for which the angle $\gamma_2$ is strictly less than 90° when taken between a portion $40i_1$ of the surface 40i located on the same side as the ring 31 with respect to the axis $X_{40}$-$X'_{40}$ and the portion of the axis $X_{40}$-$X'_{40}$ defined from the surface 40i opposite to the end 40b of the finger 40.

The effort $F_4$, corresponding to the action of the surface 33b on the surface 40h, is oriented perpendicularly to the surface 40h. The end 33b also exerts a frictional effort f on the surface 40h. This effort f tends to tilt the finger 40 in the clockwise direction in FIG. 5. When the angle $\gamma_1$, taken as previously, is strictly less than 90°, the effort $F_4$ has not only a component $F_{4A}$, parallel to the axis $X_{40}$-$X'_{40}$ of translation of the finger 40, which corresponds to the force acting on the finger to displace it in translation out of the groove 16, but also a component $F_{4B}$, perpendicular to the axis $X_{40}$-$X'_{40}$ and which generates a tilting moment of the finger 40 opposed to the tilting moment resulting from the effort f. Thus, owing to this component $F_{4B}$ which opposes the tilting of the finger 40 due to the effort f, the sliding of the finger 40 is facilitated.

It is therefore possible to eliminate practically any moment tending to tilt the finger 40 in its housing 27 by selecting an angle $\gamma_1$ such that the moments resulting from the efforts f and $F_{4B}$ balance each other out completely. The effort f depends on the coefficient of friction at the interface between the surface 33b and the surface 40h. In the example described, the surfaces in contact during the interaction between the surface 33b and the surface 40h are respectively made of plastics and of steel. In this case, satisfactory results are obtained for an angle $\gamma_1$ of between around 75° and 85°.

Similarly, the choice of orientation of the surface 40i and of the value of the angle $\gamma_2$ makes it possible to limit, and even eliminate, the risks of tilting of the fingers 40 when they are subjected to the action $F_6$ of the surface 31b and when they move in the direction of the groove 16.

Moreover, the rod 40j of each locking finger 40, which has a transverse dimension at least equal to the diameter of the cylindrical part 40A, ensures a good mechanical resistance of the finger 40 subjected to the action of the rings 31 and 33. The presence of the two lugs 40g, arranged on either side of the rod 40j, also makes it possible to balance the action of the rings 31 and 33 on each finger 40 and thus to contribute to the displacement of the fingers without tilting.

In the absence of an effort exerted on the main ring 30 by the operator, the effort $F_6$ maintains the fingers 40 in the configuration of FIG. 3, where they lock the male element B in the inserted configuration in the body 21.

The result of the above is that each finger 40 has a translation movement represented by the double arrow $F_7$ in FIG. 4, controlled by means of the main ring 30 and which takes place parallel to the coinciding axes $X_{27}$-$X'_{27}$ and $X_{40}$-$X'_{40}$. In particular, it is not necessary to act at the end 40b to cause the cylindrical part 40A to slide from its position in FIG. 3 to that in FIG. 2.

When it is desired to insert the male element B into the female element A, the effort $F_2$ can be exerted on the main ring 30 as shown in FIG. 2, thereby making it possible to disengage the fingers 40 from the channel 22, the insertion effort to be exerted then being mainly used to push the valve 23 back in opposition to the spring 26 and to the pressure prevailing in the upstream part of the channel 22.

Figure 7:
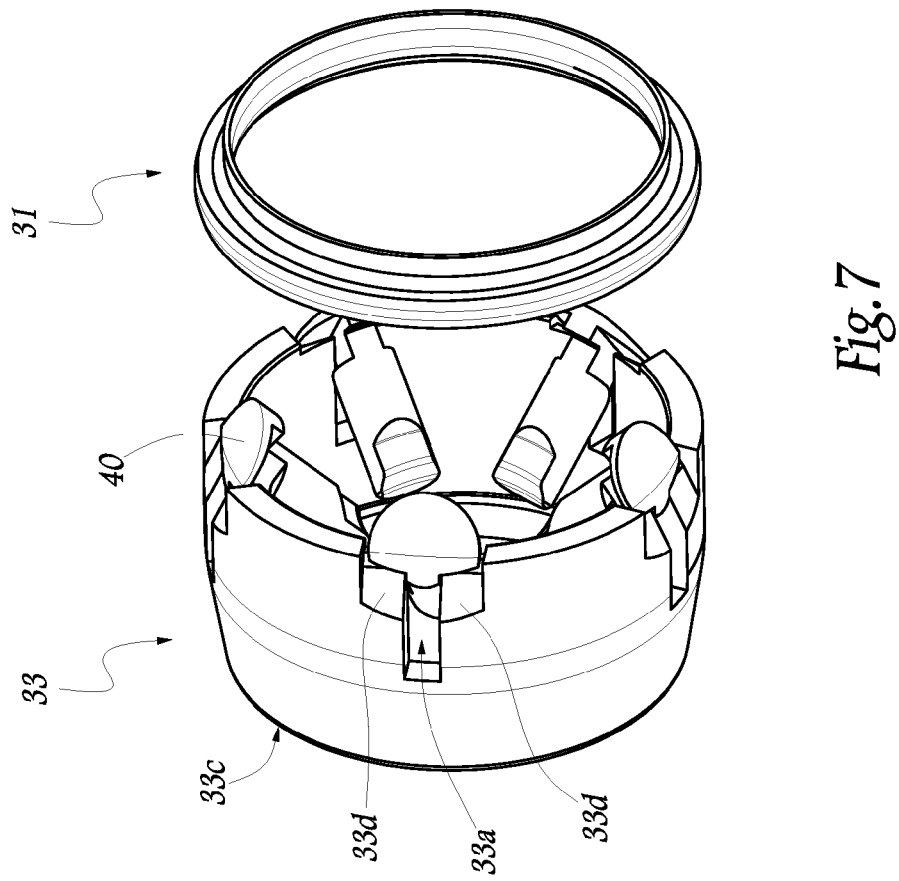
FIG. 7 is a perspective view on an enlarged scale of locking and unlocking components of the female element which is shown in FIGS. 1 to 3.
Figure 6:
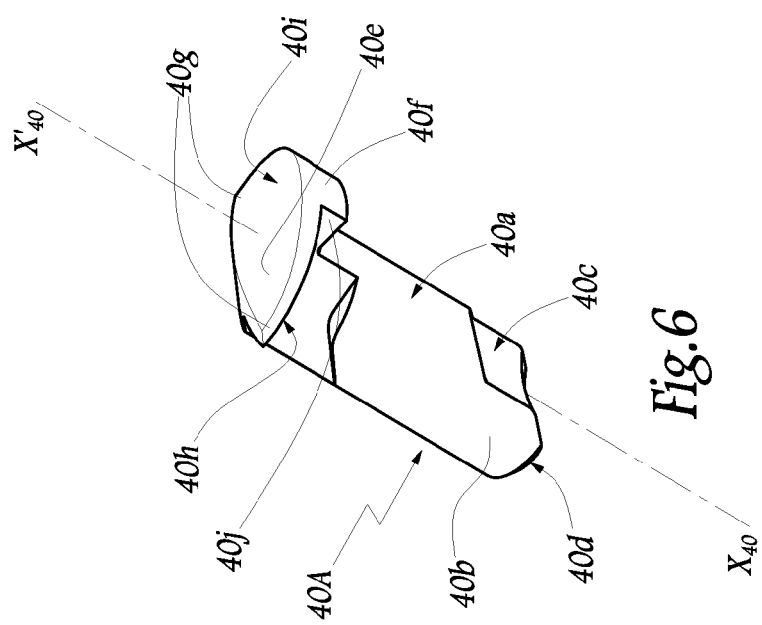
FIG. 6 is a perspective view on an enlarged scale of a locking finger of the female element shown in FIGS. 1 to 3.

As the rings 31 and 33 extend right around the body 21, as shown in FIG. 7, they make it possible to control simultaneously all the fingers 40 sliding in corresponding housings 27 of the body 21.

It is also possible to insert the elements A and B into each other without acting on the main ring 30, the end 11a of the body 11 then temporarily pushing the fingers 40 back towards the inside of the housings 27.

Figure 8:
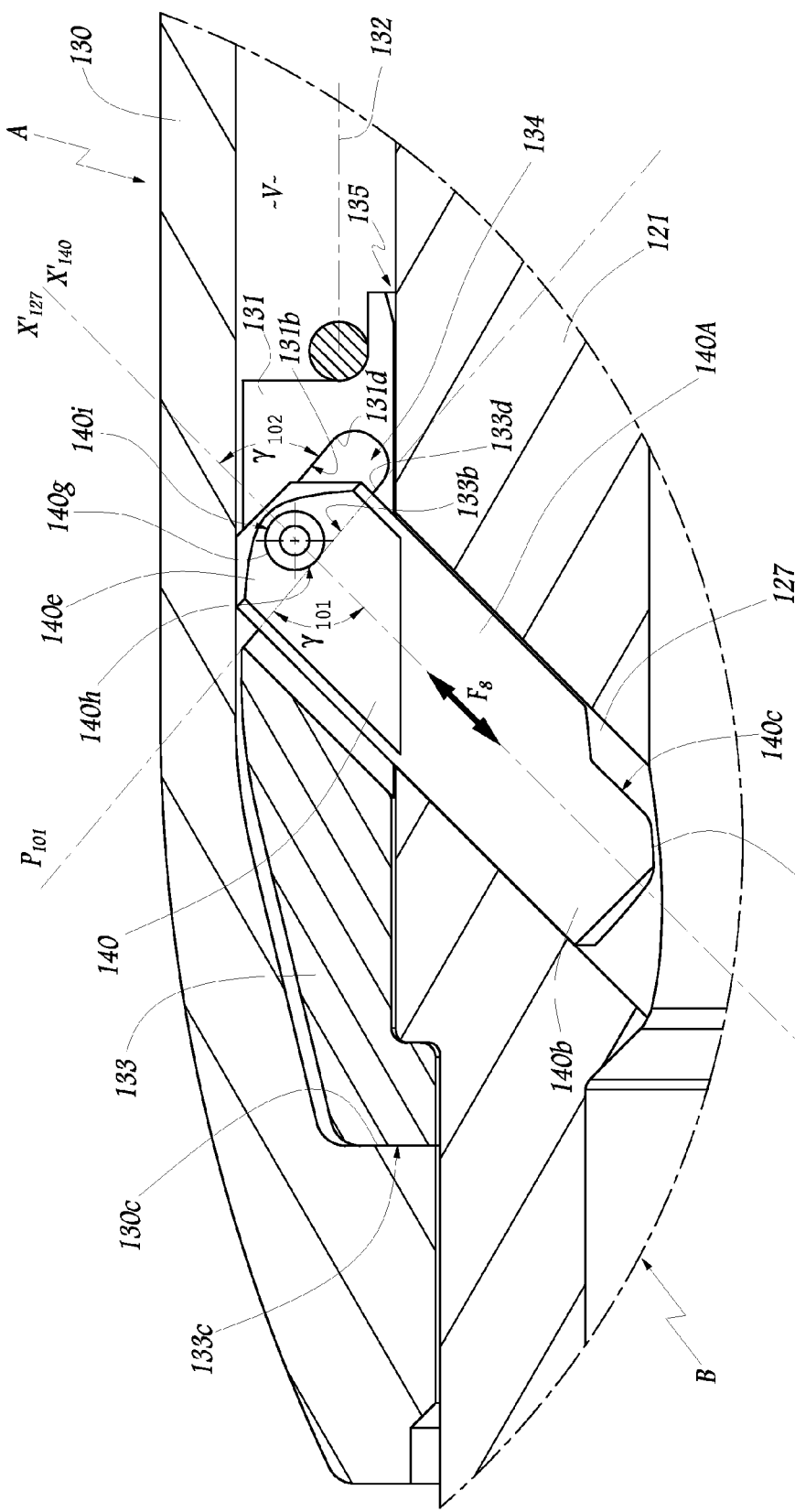
FIG. 8 is a view analogous to FIG. 4 for a coupling incorporating a female element according to a second embodiment of the invention, during the uncoupling of its male and female elements.
Figure 9:
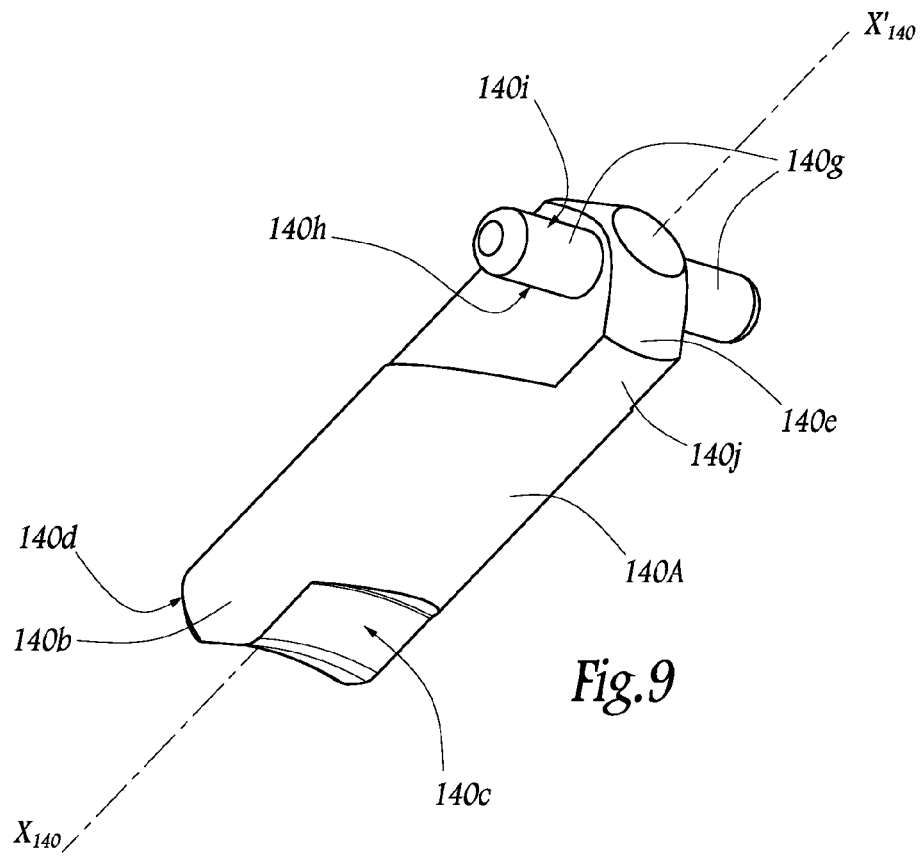
FIG. 9 is a perspective view on an enlarged scale of a locking finger of the female element of FIG. 8.
Figure 10:
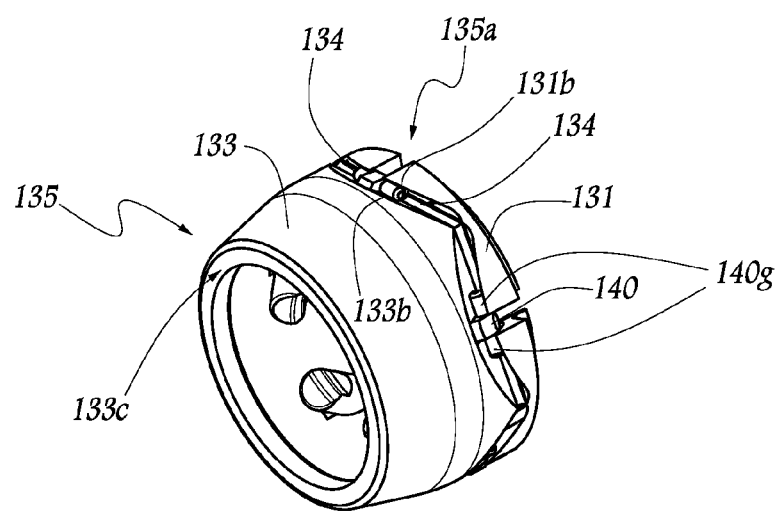
FIG. 10 is a perspective view on an enlarged scale of locking and unlocking components of the female element of FIG. 8.

In the second embodiment shown in FIGS. 8 to 10, the elements analogous to the first embodiment bear identical references increased by 100. In this second embodiment, a main ring 130 is mounted round a body 121 of the female element A and is movable in translation with respect to this latter, parallel to the central axis of the element A. The female element A comprises five locking fingers 140 arranged for each to be partially engaged in a groove 16 of a male element B, analogous to the male element of the preceding embodiment, inserted into the female element.

Each finger 140 is arranged in a housing 127 provided in the body 121 and opening both at the central channel of the female element A and at a volume V defined between the outer radial surface of the body 121 and the inner radial surface of the main ring 130. Each housing 127 is substantially complementary to a cylindrical part 140A of the fingers 140 and extends, in a similar manner to the preceding embodiment, in the direction of an axis $X_{127}$-$X'_{127}$ which is oblique with respect to the central axis of the female element. When it is in place in a housing 127, each finger 140 has its axis $X_{140}$-$X'_{140}$ coinciding with the axis $X_{127}$-$X'_{127}$.

Each finger 140 is provided with an end 140b which is intended to protrude into the central channel of the female element from the housing 127 in order to be engaged in the groove 16. The end 140b is defined by a frustoconical concave surface 140c, complementary to the side 16c of the groove 16. The end 140b is also defined by a surface 140d in the shape of a portion of a cylinder, having a circular cross-section of geometry complementary to that of the bottom 16a of the groove 16. Thus, it is possible to obtain the surface bearing of each finger 140 in the groove 16.

Each finger 140 is provided with a head 140e protruding radially with respect to the outer radial surface of the body 121, outside the corresponding housing 127. The head 140e has two lateral lugs 140g, formed by two cylindrical studs arranged in alignment with each other, on either side of a rod or stem 140j for connection between the end 140b and the head 140e, and in particular, in this embodiment, between the cylindrical part 140A and the head 140e. The rod or stem 140j has a transverse dimension, taken transversely with respect to the lugs 140g and to a longitudinal axis of the finger, equal to the diameter of the cylindrical part 140A. By way of example, the lugs 140g may be formed by a pin added on to the rod or stem 140j. The studs 140g each define a first surface 140h of the head 140e, oriented towards the end 140b of the finger 140. The studs 140 also each form a second surface 140i which is oriented opposite from the end 140b. The surfaces 140h and 140i belong to the outer radial surface of the studs 140g.

The head 140e is engaged in a slot 135a of a slotted ring 135 controlled by the main ring 130. The slotted ring 135 has a front part 133, oriented towards the mouth of the female element, and a rear part 131. The slotted ring 135 is loaded by a spring 132, at its rear part 131, and is movable parallel to the main axis of the female element, in the volume V defined between the body 121 and the main ring 130. Each slot 135a of the ring 135 has, at its lateral walls, two inclined grooves 134 for receiving the studs 140g of the fingers 140. The rod 140j of each finger 140 is movable in a portion of the corresponding slot 135a, which portion belongs to the front part 133, with the studs 140g received in the lateral grooves 134. The grooves 134 open towards the outside of the slotted ring 135 such that a bottom of each groove 134 makes it possible to limit the movement of the corresponding finger 140 towards the central channel of the female element A.

The surface 133b of the front edge 133d of each groove 134, located on the same side as the front part 133, is adapted to co-operate by sliding contact with the first surface 140h of the corresponding stud 140g. Similarly, the surface 131b of the rear edge 131d of each groove 134, located on the same side as the rear part 131, is adapted to co-operate by sliding contact with the second surface 140i of the corresponding stud 140g. The surfaces 133b and 131b are oriented substantially perpendicularly to the longitudinal axis $X_{140}$-$X'_{140}$ of the finger 140. More specifically, the surfaces 133b and 131b may be acceptably inclined, with respect to the axis $X_{140}$-$X'_{140}$, at a respective angle $\gamma_{101}$ and $\gamma_{102}$ of between around 75° and 105°. Similarly to the first embodiment of the invention, the surfaces 133b and 131b are advantageously "flowing" as defined above, so as to limit the tilting of the fingers 140 in their housings 127.

The front face 133c of the slotted ring 135 bears against a shoulder 130c provided on the inner surface of the main ring 130. Starting from the inserted position of the male element B and the female element A of the coupling according to this second embodiment of the invention, when the main ring 130 is displaced manually by an operator in the direction of the rear of the body 121, the shoulder 130c exerts on the face 133c of the ring 135 an effort which has the effect of displacing, simultaneously, each slot 135a with respect to the rod 140j and each recess 134 with respect to a stud 140g. Thus, the surface 133b of each recess 134 is displaced in the direction of the surface 140h of the corresponding stud 140g. When the surfaces 133b come into contact with the surfaces 140h, they exert on these surfaces an effort which has the effect of displacing each finger 140 in the corresponding housing 127 in the direction of the volume V. Since the surfaces 133b are oriented substantially perpendicularly to the axis $X_{140}$-$X'_{140}$, the sliding plane $P_{101}$ between each surface 140h and the corresponding surface 133b, which corresponds to the plane of the surface 133b in sliding contact against the surface 140h, is substantially perpendicular to the axis $X_{140}$-$X'_{140}$, and the displacement effort exerted on each finger 140 is substantially parallel to that axis.

When the effort exerted on the main ring 130 is released, the resilient return effort exerted by the spring 132 on the ring 135 at its rear part 131 is transmitted to each finger 140 in the form of a displacement effort in the opposite direction from the movement described previously.

Indeed, the resilient return effort of the spring 132 has the effect of displacing the surfaces 131b of the recesses 134 in the direction of the surfaces 140i of the studs 140g.

As in the first embodiment, each finger 140 therefore has a translation movement in the corresponding housing 127, represented by the double arrow $F_8$ of FIG. 8, controlled by means of the main ring 130 and which takes place parallel to the coinciding axes $X_{127}$-$X'_{127}$ and $X_{140}$-$X'_{140}$. Owing to the orientation of the surfaces 133b and 131b substantially perpendicularly to the axis $X_{140}$-$X'_{140}$, the sliding planes between each surface 140h and the corresponding surface 133b and between each surface 140i and the corresponding surface 131b, which in this second embodiment correspond respectively to the planes of the surfaces 133b and 131b in sliding contact against the surfaces 140h and 140i, are substantially perpendicular to the axis $X_{140}$-$X'_{140}$ and the displacement efforts exerted on the fingers 140 are substantially parallel to the axis $X_{140}$-$X'_{140}$. This limits the tilting of the fingers 140 in the housings 127 and permits the effective transmission of efforts to the fingers 140 in order to displace them between their locked and unlocked positions.

In addition, as in the first embodiment, the rod 140j of each finger 140 reinforces the mechanical resistance of the finger, while the action of the ring 135 at the two lugs 140g arranged on either side of the rod 140j guarantees the displacement in translation of the finger 140 without the risk of tilting. Moreover, the formation of the lugs 140g by means of a pin added on to the rod 140j allows easy and economic manufacture of the locking fingers of a female coupling element according to the invention.

According to variants of the invention that are not shown, the sliding contact between a surface of a locking finger and a corresponding surface of a ring may involve curved surfaces or a point-like contact. In this case, the sliding plane is the momentary sliding plane at the point of contact between the surfaces, this momentary sliding plane being inclined at an angle of between around 75° and 105° with respect to the axis of translation of the locking finger.

In the embodiments described, the invention is implemented with five locking fingers 40 or 140 co-operating with five regularly spaced slots 33a or 135a provided in the ring 33 or 135. This configuration makes it possible to distribute the locking effort of the male element in the inserted configuration about the axis X-X'. The invention may however be implemented with a different number of locking fingers.

In all cases, the female element A of a coupling according to the invention is adapted to a standard male element which may, for example, be mounted on an automotive vehicle. The invention does not require the male element already used on automotive vehicles to be modified.

The invention may be used in fields other than that of filling the tanks of automotive vehicles and, in general, in any field where secure coupling is sought.

The invention claimed is:

1. A female coupling element of a quick connect coupling for detachably joining two conduits of a pipeline for conveying fluid under pressure, the female coupling element comprising:

a body having a channel that extends there through for cooperatively receiving a male element inserted therein along a longitudinal axis of insertion of the female element;

at least one elongate locking member movable in translation between an inner locking position and an outer release position within an open housing in the body which communicates with the channel and is oriented at an oblique angle with respect to the channel so as to define an axis of translation of the at least one elongate locking member, the axis of translation of the at least one elongate locking member thereby being parallel to an axis oblique with respect to the longitudinal axis of insertion;

the at least one locking member having a first end which is engaged in a peripheral groove of a male element when the male element is inserted in the female element and the at least one locking member is in the inner locking position and an opposite head which protrudes radially with respect to an outer radial surface of the body of the female element;

the head of the at least one locking member being positioned between a first and a second component which are encircled and controlled by a main ring which is mounted about the body so as to be movable in translation parallel to the longitudinal axis of insertion;

the head of the at least one locking member being provided with two lugs each defining a first surface oriented towards the first end and engaging, in sliding contact along a sliding plane, a corresponding surface of the first component;

the sliding plane between the first surface and the corresponding surface of the first component being inclined at an angle of between approximately 75° and 105° with respect to the axis of translation of the member; and wherein the two lugs of the head of the at least one locking member extend outwardly from a stem, which stem is slidably engaged with respect to the first component.

2. The female coupling element according to claim 1, wherein the first surface is inclined at an angle of between approximately 75° and 105° with respect to the axis of translation of the at least one locking member.

3. The female coupling element according to claim 1, wherein the corresponding surface of the first component is inclined at an angle of between approximately 75° and 105° with respect to the axis of translation of the at least one locking member.

4. The female coupling element according to claim 1, wherein the head of the at least one locking member forms at least a second surface, oriented opposite from the first end, which receives in sliding contact a corresponding surface of the second component, a sliding plane between the second surface and the corresponding surface of the second component being inclined at an angle of between approximately 75° and 105° with respect to the axis of translation of the at least one locking member.

5. The female coupling element according to claim 4, wherein the sliding plane between the second surface and the corresponding surface of the second component is inclined with respect to the axis of translation of the at least one locking member at an angle of between around 75° and 90°.

6. The female coupling element according to claim 1, wherein the sliding plane between the first surface and the corresponding surface of the first component is inclined with respect to the axis of translation of the at least one locking member at an angle of between approximately 75 less than approximately 90°.

7. The female coupling element according to claim 1, wherein the stem of the member is received in a slot of the first component, and the first surface defined by each lug being adapted to receive, in sliding contact, a corresponding surface of a lateral portion of the slot.

8. The female coupling element according to claim 1, wherein the first component is formed by a slotted ring separate from the main ring and being displaced in translation, parallel to the longitudinal axis of insertion and in the direction of the at least one locking member, as the main ring is moved in translation.

9. The female coupling element according to claim 1, wherein the second component is a secondary ring separate from the main ring, and resilient means is provided for moving the at least one locking member and the secondary ring parallel to the longitudinal axis of insertion axis.

10. The female coupling element according to claim 1, wherein the first and second components are formed from a single ring which is separate from the main ring, and resilient means for moving the single ring in translation parallel to the longitudinal axis of insertion is provided.

11. The female coupling element according to claim 10, wherein each of the two lugs of the at least one locking member is received in a recess of the single ring, the first surface defined by each of the two lugs being in sliding contact to a corresponding surface of first component.

12. A rapid coupling for an installation handling fluid under pressure, the rapid coupling comprising a combination of a female coupling element according to claim 1 and a male element according to claim 1, wherein the male element is inserted within the female coupling element.

* * * * *